United States Patent

Capodieci

Patent Number: 5,871,793
Date of Patent: Feb. 16, 1999

[54] PUFFED CEREAL CAKES

[75] Inventor: Roberto A. Capodieci, Glen Ellyn, Ill.

[73] Assignee: Mars Incorporated, McLean, Va.

[21] Appl. No.: 757,445

[22] Filed: Nov. 27, 1996

[51] Int. Cl.$^6$ .................................. A23L 1/00; A23P 1/00
[52] U.S. Cl. ...................... 426/238; 426/285; 426/297; 426/454
[58] Field of Search .................................. 426/285, 297, 426/309, 454, 238

[56] References Cited

U.S. PATENT DOCUMENTS

| Re. 26,543 | 3/1969 | Beeson, Jr. et al. . | |
|---|---|---|---|
| 3,029,751 | 4/1962 | Gilmore | 426/285 |
| 3,961,089 | 6/1976 | Dogliotti . | |
| 3,971,838 | 7/1976 | Yazawa . | |
| 4,017,237 | 4/1977 | Webster . | |
| 4,115,489 | 9/1978 | Macfee . | |
| 4,163,768 | 8/1979 | Stephens . | |
| 4,421,773 | 12/1983 | Akutagawa . | |
| 4,500,280 | 2/1985 | Astier et al. . | |
| 4,652,456 | 3/1987 | Sailsbury | 426/309 |
| 4,735,753 | 4/1988 | Ackermann . | |
| 4,784,591 | 11/1988 | Ackermann . | |
| 4,849,233 | 7/1989 | Hemker | 426/297 |
| 5,202,064 | 4/1993 | Furusawa et al. . | |
| 5,230,761 | 7/1993 | Crawford . | |

*Primary Examiner*—George Yeung
*Attorney, Agent, or Firm*—Lockwood, Alex, FitzGibbon & Cummings

[57] ABSTRACT

The invention provides processes for the preparation of puffed cereal cakes, in particular puffed rice cakes. The processes comprise molding puffed or unpuffed cereal grains under pressure with the application of ultrasound. The ultrasound assists bonding of the cereal grains to form a solid cake. The ultrasound reduces fouling of the mold and increases processing speed. In one aspect, the starting material is prepuffed cereal grains, and these grains are coated with a binder agent and then bonded together at low temperature using ultrasound energy. This permits the formation of puffed cereal cakes with edible inclusions of temperature-sensitive foodstuffs, and also the rapid formation of puffed cereal cakes with shaped or profiled top and/or bottom surfaces.

2 Claims, 4 Drawing Sheets

FIG. 4
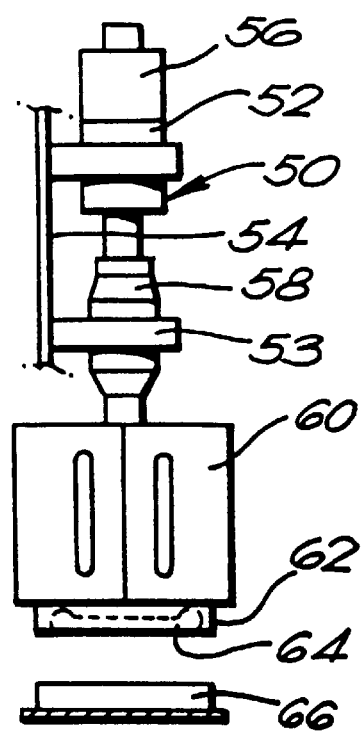
FIG. 5
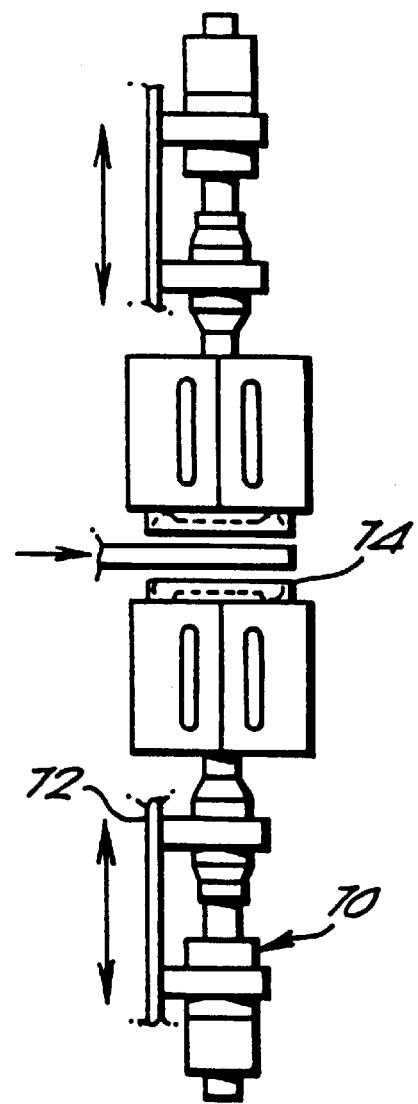
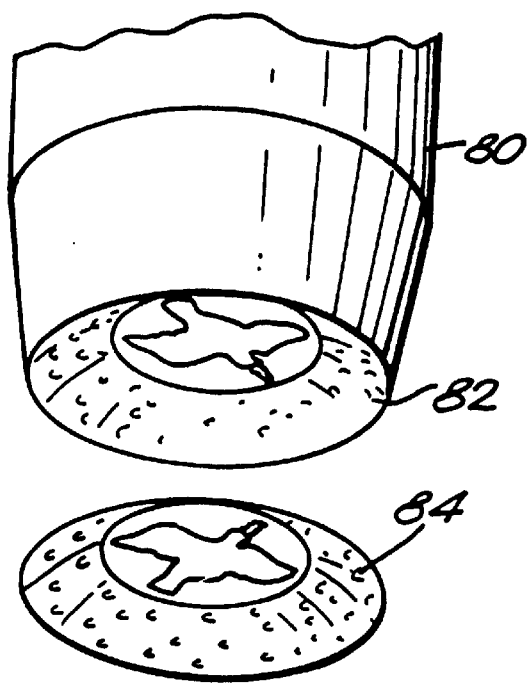
FIG. 6

PUFFED CEREAL CAKES

BACKGROUND OF THE INVENTION

The present invention relates to improved processes for the preparation of puffed cereal cakes or other products, such as rice cakes. The invention also relates to improved puffed cereal cakes, and to an apparatus suitable for use in the method of the invention. Rice is the most commonly, but not the only advantageously used cereal. Consequently, when the expression "rice" appears herein, the term is understood to be used in the illustrative rather than the limiting sense.

Rice cakes are commercially available products formed from puffed rice grains that are bonded together without a binding matrix. The rice cakes have low density, and low moisture content, and are typically the size and shape of a cookie or rusk. Similar puffed (also known as expanded) cereal cakes can be made with other cereal grains such as wheat, millet, buckwheat, barley or corn.

Rice cakes are currently made by a process comprising the steps of: (i) providing a mold comprising a plurality of mold elements including a reciprocally movable piston element for compressing rice grains inside the mold; (ii) introducing a predetermined quantity of unpuffed (i.e. plain parboiled or non-parboiled) rice into the mold, the average moisture content of this rice being typically about 16% by weight; (iii) compressing the rice grains in the mold to about 6 MPa (60 bar) pressure; (iv) heating the rice grains in the mold to a temperature of 230°–280° C.; (v) moving the piston element to expand the mold by a predetermined amount, whereupon the heated rice grains expand and bond together to form the rice cake, followed by (vi) removing the finished rice cake from the mold.

A first drawback of the above method is that it requires a pressure mold that can provide high pressures and temperatures, together with precisely controlled expansion of the mold in the puffing step. This involves considerable technical complexity. Various alternative mold designs are described, for example, in WO92/08375, WO90/08477, and EP-A-0359740.

A second drawback of the above-described existing methods of forming rice cakes is that the high temperature mold surfaces required to heat the rice quickly to the puffing temperature result in rapid build-up of carbon deposits on the mold. This necessitates frequent down time (typically 5–10 minutes every hour) for mold cleaning.

A further drawback of the above-described method is that each compression, heating, expansion and product removal cycle takes at least 6 seconds, and usually 10–12 seconds. The relatively lengthy heating and expansion cycle needed to produce each rice cake reduces the process throughput and increases the cost of the products.

A further drawback of the above-described existing methods of forming rice cakes is that the edible inclusions that can be incorporated into or onto the rice cakes are very limited. Most edible materials, such as vitamins or chocolate, are degraded by the high temperatures used to form rice cakes. In fact, existing rice cakes generally only contain rice and salt, with flavoring agents optionally applied to the surface of the rice cake after it has been formed. This contributes to the limited consumer acceptance of existing rice cakes.

Finally, the high pressure expansion used to form rice cakes according to the prior art means that only a limited range of rice cake shapes is available. In particular, the top and bottom faces of the rice cakes obtained by this method are substantially parallel and flat, i.e. free from patterns or shapes in relief.

In view of the above and other shortcomings of prior art methods and apparatus, it is an object of the present invention to provide an improved process for the preparation of puffed cereal cakes, in particular puffed rice cakes.

Another object of the present invention is to provide a process for the preparation of puffed cereal cakes that is faster than existing methods.

It is a further object of the present invention to provide a process for the preparation of puffed cereal cakes that requires less equipment down-time than existing methods.

Yet another object of the present invention is to provide a process for the preparation of puffed cereal cakes that permits the inclusion of heat-sensitive edible materials into the puffed cereal cakes obtained by the method.

It is a still further object of the present invention to provide a process for the preparation of puffed cereal cakes having top and/or bottom surfaces that are patterned or shaped in relief.

A further object of the invention is to provide puffed cereal cakes, in particular puffed rice cakes, having incorporated therein heat-sensitive edible substances.

One more object of the present invention is to provide puffed cereal cakes, in particular, puffed rice cakes, having a top and/or a bottom surface that is patterned or shaped in relief.

Finally, it is an object of the present invention to provide an improved apparatus for the preparation of a puffed cereal cake, specifically adapted for use in a process according to the present invention or for the production of a rice cake according to the present invention.

In a first aspect, the present invention provides a process for the preparation of a puffed cereal cake comprising the steps of: providing a mold comprising a plurality of mold elements including a reciprocally movable piston element for compressing material inside said mold; introducing a predetermined quantity of unpuffed cereal grains into said mold; compressing the cereal grains in the mold; applying ultrasonic energy to the cereal grains in the mold; moving said piston element to expand the mold by a predetermined amount while applying said ultrasonic energy to the cereal grains to cause expansion and bonding of the cereal grains to form the puffed cereal cake; and removing the puffed cereal cake from the mold.

It has been found that the application of ultrasonic energy to heat the cereal grains during the heating and expansion steps results in a number of technical advantages. First, the time required to heat the cereal grains to their puffing temperature of 210° C.–280° C. is reduced, because the ultrasonic energy heats the cereal grains directly.

A further advantage of the application of ultrasonic energy is that the expansion and bonding of the cereal grains is accelerated. This means that the cycle of compression, heating and expanding the cereal grains can all be completed in less than 5 seconds, and preferably in 2.0 seconds or less. This compares with at least 6–8 seconds needed in the absence of ultrasonic energy.

Yet another advantage of the application of ultrasonic energy is greatly reduced carbonization of the mold. This is partly because of the reduced dwell time of the heated cereal grains in the mold, and partly because the ultrasonic apparatus is self-cleaning. The reduced carbonization of the mold results in reduced down-time and faster throughput.

Yet another advantage of the application of ultrasonic energy is that the ultrasound reduces sticking of the finished cereal cakes to the mold.

The starting material for this process can be brown or milled, parboiled or non-parboiled rice, preferably having a moisture content of 16–28% w/w.

It will be noted that the process according to the first aspect of the present invention retains certain disadvantages of the prior art, including the need for a high pressure expansion step and the need for high temperatures to puff the cereal grains. This means that shaped puffed cereal cakes, and/or puffed cereal cakes having heat-sensitive edible inclusions cannot readily be made by the process according to the first aspect of the present invention. In addition, a high pressure mold is required, as described above for the prior art methods. The mold should be capable of rapid, controlled expansion in order to take advantage of the faster puffing time provided by this aspect of the invention.

Accordingly, in a second aspect, the present invention provides a process for the preparation of a puffed cereal cake, comprising the steps of: providing a mold comprising a plurality of mold elements including a reciprocally movable piston element for compressing material inside the mold; coating prepuffed cereal grains with a binder material; introducing a predetermined quantity of the coated prepuffed cereal grains into the mold; compressing the coated prepuffed cereal grains in the mold; applying ultrasonic energy to the coated prepuffed cereal grains in the mold to bond the grains together to form the puffed cereal cake; followed by removing the puffed cereal cake from the mold.

In this context, the expression "prepuffed cereal grains" means cereal grains, such as rice grains, wheat grains or popcorn grains, that have been puffed by micronizing, gun-puffing, extrusion or other puffing methods conventionally known in the art. Such methods are described, for example, in *"Rice Chemistry and Technology"*, Bienvenido O. Juliano ed., published by the American Association of Cereal Chemists, St. Paul, Minn. (1982).

The present inventors have found, surprisingly, that suitably coated prepuffed cereal grains can be bonded together by imbedding said prepuffed cereal grains in a substantially continuous matrix of an edible, heat-plasticizable material to form a puffed cereal cake by applying a moderate pressure and applying ultrasonic energy to the compressed prepuffed cereal grains. This simplified process provides a number of advantages, as follows.

A first advantage is that the puffed cereal cakes can be formed at much lower pressures, without a controlled expansion step as in the prior art methods. It is merely necessary to compress the prepuffed cereal grains at preferably 0.1–2.0 MPa (1–20 bar) before applying the ultrasonic energy. Thus, the cost and complexity of the cereal cake mold is greatly reduced.

A second advantage of this aspect of the invention is that little or no heating of the prepuffed cereal grains is required to achieve bonding. Preferably, the average temperature of the prepuffed cereal grains does not exceed 100° C. during the process according to this aspect of the invention, and more preferably the average temperature of the prepuffed cereal grains does not exceed 70° C. Preferably, all of the heating is due to absorption of the ultrasonic energy.

The relatively low temperature at which the process according to this aspect of the invention is carried out permits the introduction of heat-sensitive food inclusions into the puffed cereal cake simply by introducing a heat sensitive food product into the mold at the same time as the prepuffed cereal grains. Preferred heat-sensitive food products include vitamins, chocolate, fruits, candied fruits, dried fruits, nuts, sugars, edible gums, edible fats, caramel, flavorings in dry or liquid form, and colorants.

The relatively low temperature at which the cereal cake formation takes place also eliminates the problem of carbon deposition in the mold, thereby reducing down time and increasing throughput of the process.

A third advantage of the process according to the this aspect of the invention is that formation of the puffed cereal cake is extremely fast. Preferably, the step of bonding the prepuffed cereal grains together by means of the ultrasonic energy is completed in 2 seconds or less, more preferably 1 second or less, and most preferably 0.5 second or less. This greatly increases the throughput of the process.

A fourth advantage of the process according to the this aspect of the invention is that, because there is no expansion step, it is possible to use a shaped mold with non-parallel, non-planar top and bottom mold elements. This permits the formation of a shaped cereal cake product having a non-planar top or bottom surface. Preferably, the non-planar top or bottom mold element is patterned or shaped in relief, and the minimum feature width of the pattern or shape is less than 15 mm, more preferably less than 10 mm. It would be very difficult to use such a patterned or shaped mold element in puffed cereal cake manufacture by the high temperature, high pressure expansion method. Preferably, the depth of the pattern or shape in relief is at least 25%, and preferably at least 50% of the maximum depth of the mold cavity.

It will readily be appreciated that the process according to this aspect of the invention can be used to make a wide variety of shaped, puffed cereal cake products for different market niches. For example, puffed cereal cakes shaped like animals (e.g. turtle, elephant) would be appealing to children. Puffed cereal cakes in the shape of a bone would be a suitable snack food for dogs. Puffed cereal cakes in the shape of a mouse could be a suitable snack food for cats.

The binding of the puffed cereal grains to form the puffed cereal cake in the process according to the this aspect of the invention is assisted by the additional step of applying a coating of a suitable binder material in the form of an edible heat-plasticizable material to the prepuffed cereal grains prior to compression. The coating may, for example, comprise a cereal flour, a sugar or an edible gum. Suitable cereal flours include rice flour, wheat flour and corn flour. Suitable sugars include dextrans, maltodextrins, syrups of glucose, fructose, maltose, sucrose or mixtures thereof, and caramels. Suitable edible gums include xantham gum, guar gum, carrageenan, locust beam gum and mixtures thereof. Other coatings may comprise starches, modified starches, or gelatins.

Preferably, the binder comprises an aqueous liquid. More preferably, the coating comprises at least 80% w/w of water, most preferably at least 95% of water. The aqueous liquid coating may contain dissolved vitamins, colorants or flavoring agents. Preferably, the aqueous liquid is sprayed onto the puffed cereal grains shortly before the compression step, preferably no more than 60 seconds before the compression step, and most preferably no more than 20 seconds before the compression step. It is thought that water assists the binding of the prepuffed cereal grains by softening and partially dissolving components at the surface of the grains, including local reactivation of the starch. In addition, water is a good susceptor for ultrasound and will tend to localize ultrasonic heating at the surfaces of the puffed grains, where bonding takes place.

Preferably, the binder coating is applied to the prepuffed cereal grains in an amount of from 0.1 to 100% by weight, more preferably 5 to 50% by weight, and most preferably 10 to 30% by weight based on the dry weight of the prepuffed cereal grains. The binder coating may also be applied to the edible inclusions, where these are added to the cereal grains. Preferably, the binder does not make up more than 10% by volume, more preferably not more than 2% by volume, and most preferably not more than 1% by volume of the puffed cereal.

It will be appreciated from the foregoing discussion that the preferred cereal grains for the processes according to either aspect of the present invention comprise rice grains. More preferably the cereal grains consist essentially of rice grains. However, the processes according to the present invention are also applicable to other puffable cereal grains, such as wheat, millet, buckwheat, barley or corn, such as popcorn, or mixtures thereof.

Preferably, the ultrasonic energy in the processes according to the present invention is applied at a frequency of from 10 kHz to 40 kHz. Preferably, the energy is applied by an ultrasonic actuator such as a piezoelectric actuator to one or more of the mold elements, and the surface of the mold element driven by the actuator moves through an amplitude of from 10 to 50 $\mu$m.

The molding step may be followed by a drying step to dry the cereal cake preferably at 50°–100° C. to a moisture content of less than about 5% by weight, preferably to about 2–3% by weight.

In a third aspect, the present invention provides a puffed cereal cake having a non-planar top or bottom surface.

Preferably, the non-planar top or bottom surface is patterned or shaped in relief, and the minimum feature width of the pattern or shape is less than 15 mm, more preferably less than 10 mm. The depth of the pattern or shape in relief is preferably at least 25%, and more preferably at least 50% of the maximum thickness of the puffed cereal cake.

The puffed cereal cakes may be made in a range of consumer acceptable shapes and configurations, as discussed above.

In a fourth aspect, the present invention provides a puffed cereal cake having a heat-sensitive food product, flavoring or colorant incorporated therein. Preferably, the heat-sensitive food product is selected from the group consisting of vitamins, chocolate, candied fruits, dried fruits, nuts, sugars, edible gums, edible fats, caramel, liquid and solid flavorings, and colorants.

The puffed cereal cake according to the fourth aspect of this invention may, of course, also be patterned or shaped in accordance with the third aspect recited above.

It will appreciated that the puffed cereal cake according to the third or fourth aspects of the present invention may itself be enrobed in an edible coating such as chocolate or otherwise incorporated into a compound edible structure.

In a fifth aspect, the present invention provides an apparatus for the manufacture of a puffed cereal cake, the apparatus comprising: a mold comprising a plurality of mold elements, including a reciprocally movable piston element for compressing cereal grains inside the mold; and an ultrasonic oscillator coupled to at least one of said mold elements to apply ultrasonic energy to the compressed cereal grains in the mold.

Preferably, the apparatus further comprises means for applying a coating of a binder to prepuffed cereal grains prior to introduction of the prepuffed cereal grains into the mold. More preferably, there are means adapted to apply a coating of an aqueous solution or suspension to the prepuffed cereal grains immediately before the grains are introduced into the mold.

Preferably, at least one of the mold elements is patterned or shaped in relief, and the minimum feature width of the pattern or shape is 50 mm or less, more preferably 10 mm or less.

Preferably, the apparatus further comprises means for introducing batches of puffed or unpuffed cereal grains of predetermined size into the mold for compression and molding of puffed cereal cakes.

Preferably, the apparatus further comprises additional heating means, such as electrical resistive heating means, for heating the cereal in the mold.

Specific embodiments of the present invention will now be described further, by way of example, with reference to the accompanying drawings.

BRIEF DESCRIPTION OF THE DRAWINGS

FIG. 4 shows a partial side elevation view of an ultrasonic cereal cake forming mold for use in methods according to the second aspect of the present invention;

FIG. 5 shows a partial side elevation view of an alternative ultrasonic cereal cake making apparatus for use in accordance with the second aspect of the present invention;

FIG. 6 shows a detail of the mold face of the resonant piston head (sonotrode) in a third embodiment of an apparatus for use in accordance with the second aspect of the present invention.

DESCRIPTION OF THE PREFERRED EMBODIMENTS OF THE INVENTION

Figure 1:
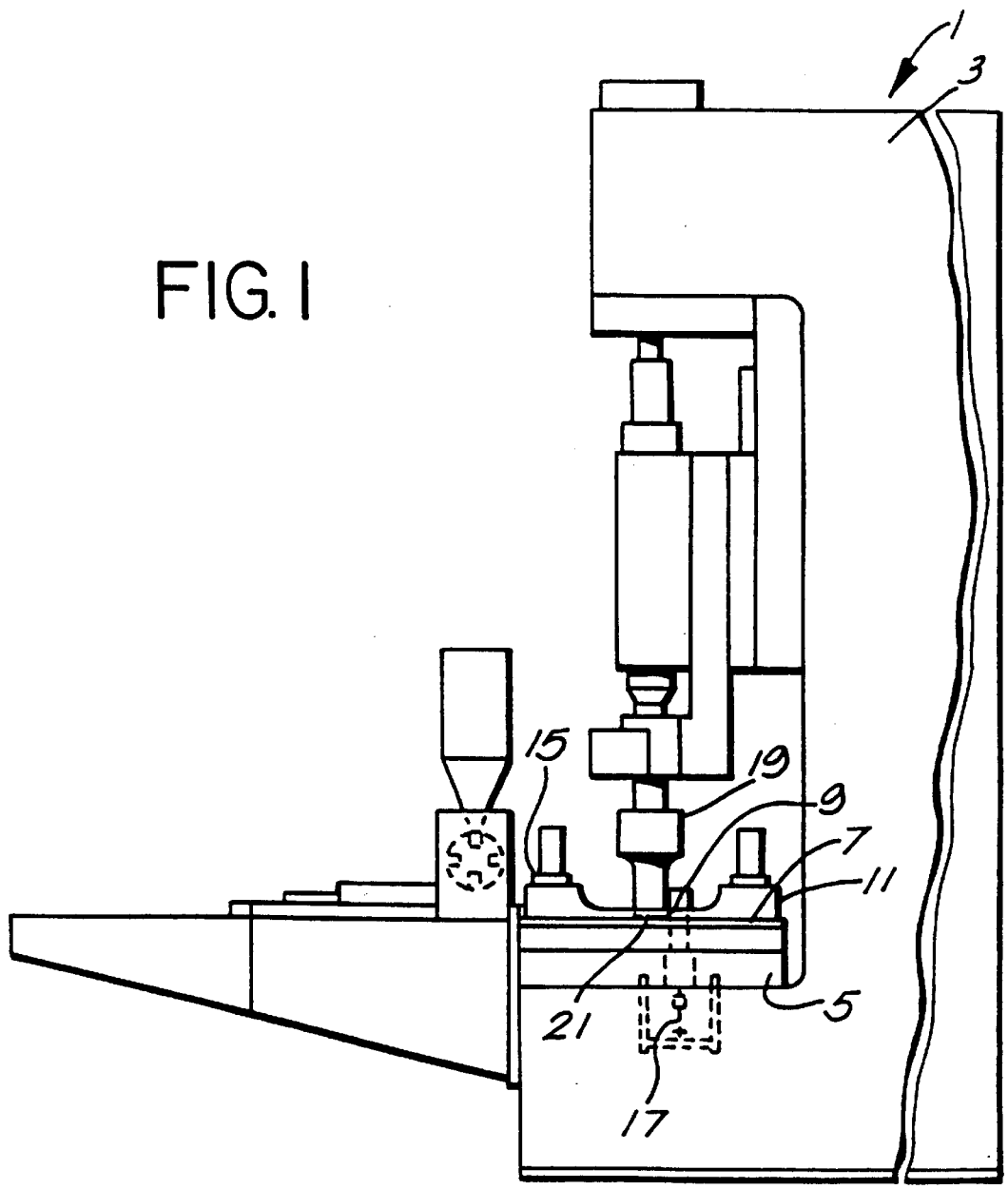
FIG. 1 shows a transverse sectional view of a high pressure ultrasonic rice cake forming apparatus for use in the method according to the first aspect of the present invention.
Figure 2:
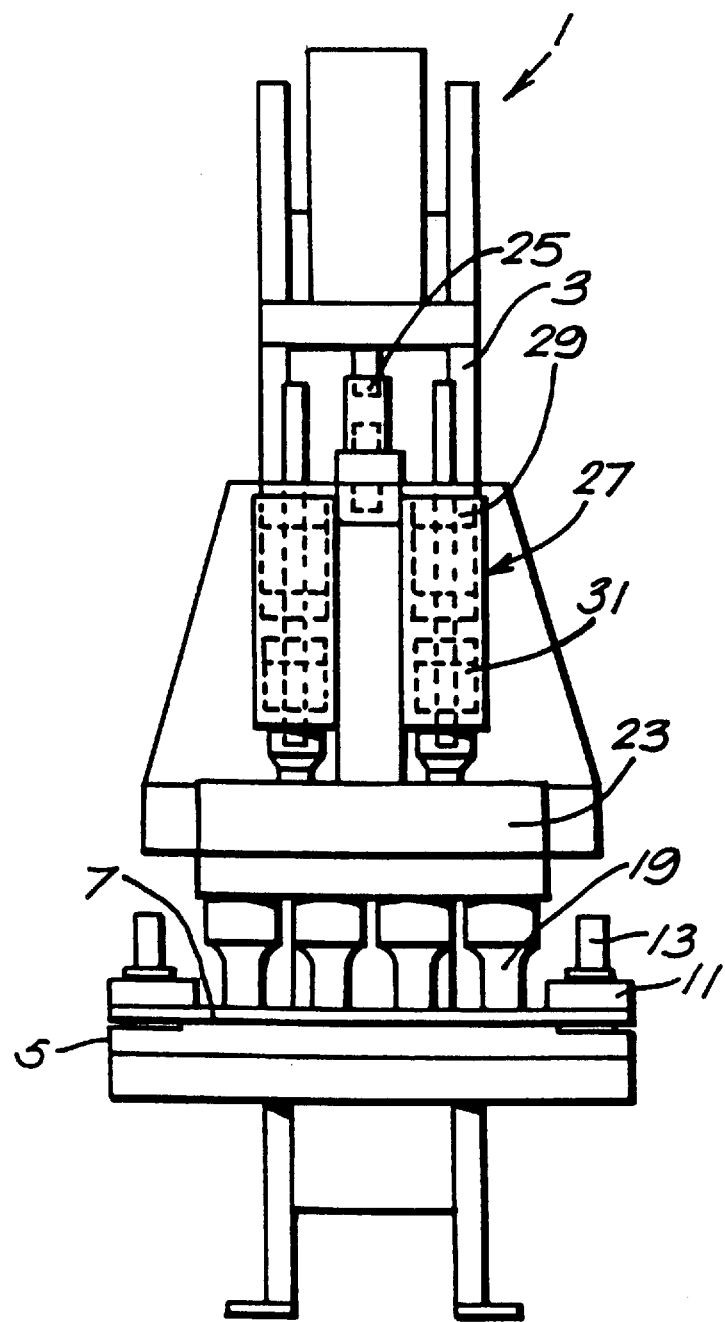
FIG. 2 shows a longitudinal sectional view of the high pressure ultrasonic rice cake forming press of FIG. 1.
Figure 3A:
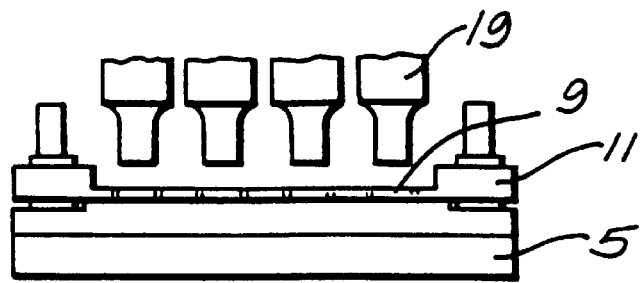
FIGS. 3 A–E are front elevation views of the mold region of the apparatus of FIGS. 1 and 2, showing steps in the inventive process for ultrasonic rice cake forming.
Figure 3B:
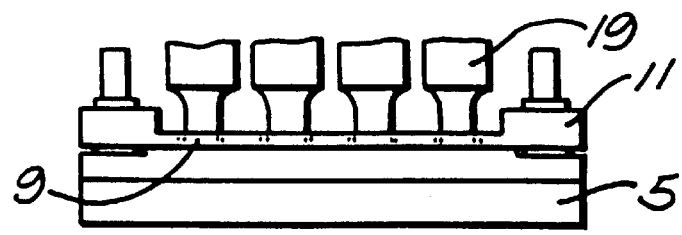
Figure 3C:
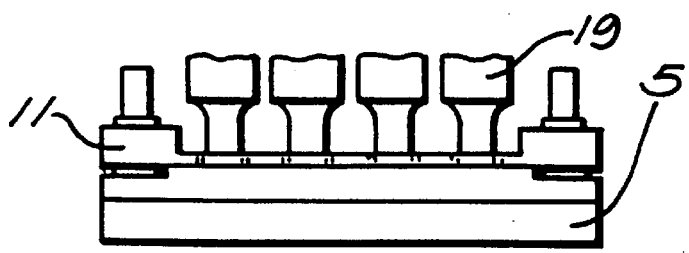
Figure 3D:
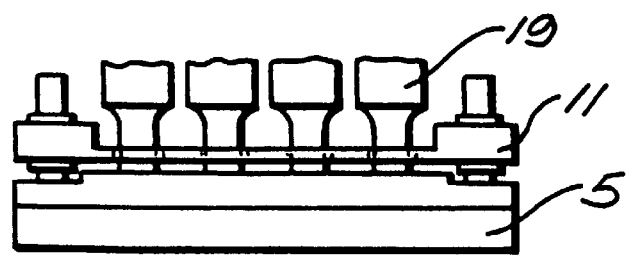
Figure 3E:
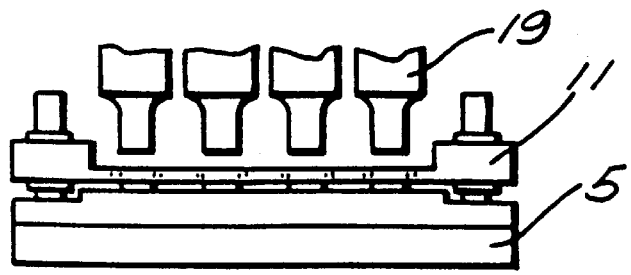

Referring to FIGS. 1–3, the high pressure ultrasonic rice cake forming apparatus 1 comprises a support frame 3 onto which the press is mounted. A mold table 5 in a lower part of the frame 3 has an upper surface 7 that defines the bottom of the mold. The sides of the mold are defined by four cylindrical apertures 9 in a mold plate 11 that rests on the upper surface 7. The mold plate 11 is vertically moveable along pegs 13 projecting upwardly from the table 5 that extend in sliding engagement through matching apertures 15 in the mold plate 11. The table 5 and mold plate 11 are typically formed of stainless steel, and the mold plate 11 typically weighs about 30 kg and defines a mold depth of about 1 cm. The mold plate 11 can be raised or lowered by means of actuator 17.

The top element of the mold cavity is formed by a sonotrode horn 19 having a flat, planar bottom surface 21 that defines the top surface of the mold cavity. The lower part of the sonotrode horn 19 is cylindrical, and is slidably received in the aperture 9 in the mold plate 13 in piston fashion. Four such piston-sonotrodes are provided, one for each of the mold apertures in the mold plate 11. All four piston-sonotrodes are driven by chamber bar 23, being joined thereto by bolts or similar means. The chamber bar 23 is, in turn, driven by hydraulic/pneumatic assembly 25 (for applying pressure), and by two ultrasonic driver assemblies 27 (for applying ultrasonic energy).

The hydraulic/pneumatic driver is secured to the top of the mold frame 3, and employs conventional pneumatic/ hydraulic cylinders to apply pressures up to 100 bar to the piston-sonotrode surfaces 21.

The ultrasonic drive assemblies 27 each comprise a power supply (not shown) that furnishes electrical energy through a radio frequency cable to a converter 29 wherein high frequency (typically 20 kHz) electrical energy is transduced into vibratory mechanical motion, preferably by a plurality of piezoelectric transducer devices. The output of the converter 66 is amplified, in what is termed a booster assembly 31, and the output end face of the booster 31 is secured by suitable means such as a bolt to the upper surface of the chamber bar 23. The ultrasonic driver assembly is secured at nodal points to the mold press frame 3. The ultrasonic driver assembly 27, chamber bar 23 and piston/sonotrodes 19 are configured and arranged so that an antinode of near-maximum mechanical vibration amplitude is situation at the end faces 21 of the piston/sonotrodes. The amplitudes of vibration may vary depending upon on the power and tool design. However, with frequencies of 20 kHz being used to mold larger pieces, and other frequencies, such as 40 kHz, being used to make smaller pieces, the amplitudes at the sonotrode surfaces 21 that have been found useful have ranged from 5 µm at an "off duty" or idle level, to up to 15–30 µm at an 80% power level, and 20 to 35µ at currently preferred full power levels. However, it is envisaged that vibration amplitudes up to 100 µm could be useful on the practice of the present invention. It will be appreciated that the ultrasonic vibration amplitudes may vary during the molding cycle, as described in more detail below.

The amplitude of the vibrations at the sonotrode faces 21 will depend both on the energy input to the ultrasonic driver assemblies 27 and on the frequency, since this will influence whether the end faces 21 are an optimum antinode position.

It has been found preferable to form the piston-sonotrode elements 19 from titanium alloys. The mechanical properties of these alloys, and their compatibility with food products combine with their desirable acoustic properties to render them highly suitable for use in the present invention.

Referring now to FIG. 3, the molding process proceeds as follows. In step A, the mold plate 11 rests flat on the top surface of the mold table 5, thereby defining four cylindrical recesses 9. The piston-sonotrode elements 19 are positioned directly above the respective recesses 9. A predetermined quantity of plain, milled, unpuffed rice having a moisture content of 16% in an amount exactly sufficient to form one rice cake is then feed into each of the recesses 9.

In step B, the piston-sonotrode elements 19 are lowered into the recesses 9, and pressed down at 60 bar pressure, thereby compressing the rice in the mold cavity such that the depth of the mold cavity is reduced to approximately 0.5 mm. The ultrasonic driver assemblies 27 are then energized to apply ultrasonic energy to the compressed rice in the mold. The ultrasonic energy rapidly heats the rice to its puffing temperature of 210°–270° C. Auxiliary heating of the rice (e.g. by electrical heating elements associated with the mold) may also be applied, if needed. The application of ultrasonic energy is continued for approximately two seconds to bring the rice up to the desired puffing temperature.

In alternative embodiments, a part of the heating of the rice is carried out by electrical heating elements in the mold that heat one or more surfaces of the mold cavity to 210°–270° C. In such embodiments, the ultrasound may be limited to a short burst to accelerate puffing/bonding, and to prevent sticking of the cereal cake to the mold.

In step C, expansion and bonding of the rice grains takes place to form the desired rice cake. In this step, the mold cavities 9 are enlarged in step fashion from a thickness of approximately 0.5 mm to a thickness of approximately 10 mm by raising the piston-sonotrodes 19. The volume of the mold cavity is thereby increased by a factor of about 15–25. The expansion step takes approximately 200 milliseconds, and is followed by reduction of the power input to the ultrasonic driver assemblies so as to allow the rice cakes to cool. Venting of steam from the molds also takes place following the expansion step.

In step D, the mold plate 5 is raised by a distance slightly greater than the thickness of the finished rice cakes while holding the piston-sonotrodes 19 fixed, whereby the finished rice cakes 30 are stripped from the mold plate 11, and are left resting on the top surface 7 of the mold table.

Finally, in step E, the piston-sonotrodes are retracted upwards, leaving the finished rice cakes 30 resting freely on the top surface 5 of the mold table, from which they are ejected by a sliding bar (not shown).

Referring to FIG. 4, the apparatus for performing the method according to the second aspect of the present invention is considerably simpler than the apparatus of FIGS. 1–3, since the use of high pressures and temperatures is no longer necessary. The apparatus shown in FIG. 4 comprises an ultrasonically energized stack generally designated 50. The stack is shown to be carried by a pair of brackets 52,53 at node points of the stack, the brackets 52,53 being secured to a reciprocable plunge bar 54. The stack 50 includes an ultrasonic converter 56, a booster 58, and a sonotrode generally designated 60 having a tool 62 with a forming cavity 64. The apparatus further comprises an anvil 66 including an upwardly facing contact surface 68, which may be profiled. The tool and anvil are preferably formed from stainless steel or titanium alloy. Where necessary, a thin gasket or layer of another material, such as a polyurethane elastomer (not shown) may be provided on the anvil 66 if contact between opposed surfaces would be damaging to the tool. In addition, the anvil 66 may be made from polytetrafluoroethylene (PTFE) material so that it is not damaged by contact with the ultrasonic tool 60.

FIG. 5 shows a similar apparatus to FIG. 4, except that the anvil 74 itself is also mounted on a second ultrasonic stack 70. The second ultrasonic stack 70 may be mounted to a second reciprocable bar 72.

FIG. 6 shows a sonotrode tool head 80 for an alternative embodiment of the apparatus for use in a method according to the second aspect of the present invention. The bottom surface 82 of the sonotrode is profiled to define a shaped mold cavity. In use, the sonotrode 80 is pressed against a flat anvil surface (not shown) to form a profiled puffed cereal cake 84 in accordance with the present invention.

In use, a predetermined quantity of coated, puffed cereal grains is placed in the anvil cavity. The ultrasonic stack 50 is lowered to compress the coated puffed cereal in the mold cavity to a pressure typically of 0.1–10 bar. The ultrasonic stack is energized as described above for the first aspect of the invention, and bonding of the puffed cereal grains to form a puffed cereal cake is achieved in a very short time, typically from 60 to 150 milliseconds. The ultrasonic stack is then raised, and the molded puffed cereal cake is ejected from the mold.

The power supplied to the ultrasonic stack may be varied during the forming operation, as discussed above for the first aspect of the present invention.

Specific examples of the method and products according to the present invention will now be described further, by way of example. It will be appreciated that many other embodiments falling within the scope of the accompanying claims will be apparent to the skilled reader.

EXAMPLE 1

In the process according to the first aspect of the present invention, a weighed quantity of raw, unpuffed rice having moisture content of 16% by weight is introduced into the mold cavity 5. The pressure piston 4 is brought down, and a pressure of 6 MPa is applied between the piston and the anvil 3. The ultrasonic stacks are then energized.

The direct energy injection from the sonicator raises the temperature of the rice to its puffing temperature of 250°–270° C. within about 2 seconds. Expansion of the mold cavity 5 is then initiated by retracting the piston 4. The extremely rapid expansion and bonding of the rice grains due to the ultrasonic energy enables the expansion step to be carried out very rapidly, typically in less than 2 seconds. The volume of the mold cavity is increased by a factor of 5–9, typically about 6, in the expansion step.

Immediately following the expansion step, the piston 4 and sonicator 6 are lifted clear of the mold cavity 5, and the finished rice cake is expelled from the mold cavity 5, for example by raising the anvil 3.

EXAMPLE 2

In a process according to the second aspect of the present invention, the pressure mold shown in FIG. 1 is used with the shaped piston head 10 shown in FIG. 2. The bottom surface 11 of the shaped piston head bears, in reverse relief, the shape of a tortoise.

In the process according to the second aspect of the invention, a measured amount of prepuffed rice (Quaker Puffed Rice—Registered Trade Mark) is sprayed with approximately 12% by weight of water using an atomizer, and then introduced immediately (i.e. within 20 seconds) into the mold cavity 5. The piston head 10 is brought down to compress and shape the prepuffed rice and the sonicator 6 is energized. Bonding of the prepuffed rice grains to form a shaped rice cake is achieved within 200 ms, and the piston 10 is then retracted to allow the product rice cake to be expelled. A subsequent drying step to remove excess moisture may be carried out.

Comparative experiments were also carried out to study the formation of rice cakes with smaller amounts and larger amounts of water as binder. It was found that rice cakes made with less than about 5% w/w of water as binder tended to crumble when handled. Rice cakes made with more than about 20% w/w of water tended to shrink significantly in the molding step. This shows that the precise amount of the binder coating must be optimized for each binder and cereal grain.

EXAMPLE 3

A process according to the second aspect of the invention for the preparation of a rice cake with blueberry fruit inclusions is performed as follows.

Quaker Puffed Rice (Registered Trade Mark) cereal 50 g and fresh blueberries 50 g are mixed. 10 g of water are sprayed onto the mixture with stirring, and the mixture is then molded as in Example 2.

The product is a shaped rice cake with blueberry inclusions. The inclusions have a fresh and natural appearance and taste.

EXAMPLE 4

A process according to the second aspect of the invention for the preparation of a puffed rice cake with chocolate chip inclusions is carried out by the method described in Example 3, with replacement of the blueberries by 50 g chocolate chips.

The product is a puffed rice cake having good integrity and chocolate chip inclusions. The chocolate chips have substantially the same shape, color and organoleptic properties as the starting chocolate chips.

The above embodiments have been described by way of example only. Many other embodiments falling within the scope of the accompanying claims will be apparent to the skilled reader.

I claim:

1. A puffed cereal cake produced by a process of applying ultrasonic energy to a quantity of prepuffed cereal grains contained in a mold, said cereal cake comprising a plurality of puffed cereal grains secured to one another by being embedded in a substantially continuous matrix of an edible heat-plasticizable material, said cereal cake including additives susceptible to heat degradation, said additives being free from degradation at temperatures characterizing expansion and bonding through the application of ultrasonic energy.

2. A puffed cereal cake according to claim 1, wherein said additives are selected from the group consisting of vitamins, chocolate, candied fruit, dried fruit, nuts, sugars, edible gums, edible fats and caramel.

\* \* \* \* \*